Patented Aug. 23, 1932

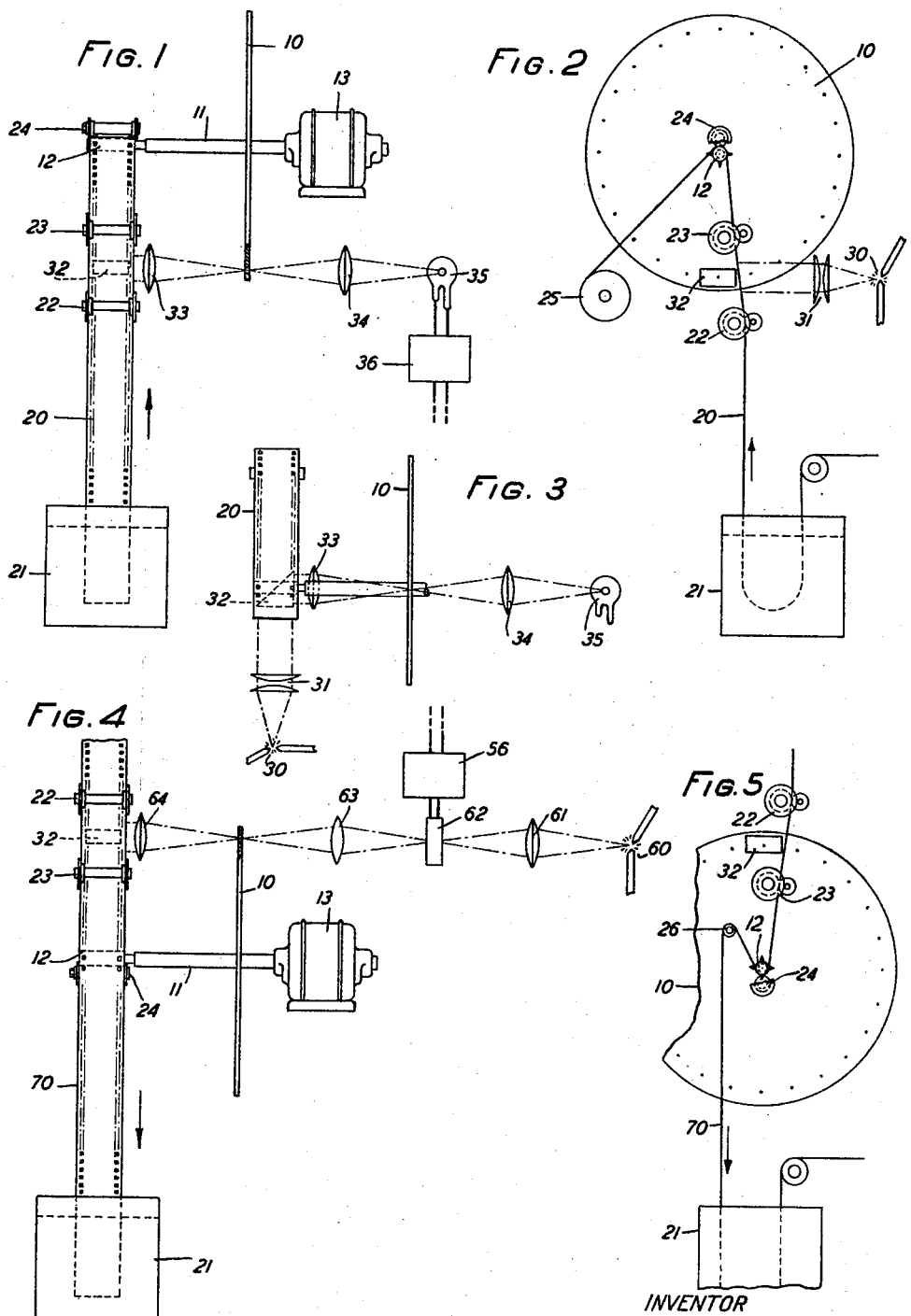

1,873,387

UNITED STATES PATENT OFFICE

FRANK GRAY, OF NEW YORK, N. Y., ASSIGNOR TO BELL TELEPHONE LABORATORIES, INCORPORATED, OF NEW YORK, N. Y., A CORPORATION OF NEW YORK

ELECTROOPTICAL SYSTEM

Application filed November 17, 1930. Serial No. 496,099.

This invention relates to electro-optical systems and more particularly to terminal apparatus for television systems employing moving film.

An object of this invention is to provide improved scanning means for scanning in succession elemental areas of a moving picture film or other similar pictorial or message strip. An important feature is the direct driving arrangement for advancing the moving film in synchronism with the scanning mechanism in either or both the transmitting and the receiving terminal apparatus of television systems. In systems employing moving film and means for scanning elemental areas thereof in succession it is necessary that both the relative position and the relative movement between the film and the scanning means be accurately maintained at all times.

The electrical transmission may take place over a single channel or a plurality of channels simultaneously, depending upon whether single or multiple channel operation is employed.

In other inventions for television transmission in which moving picture film is employed in transmission or in reception, indirect driving means have been employed for causing the proper relative movement between the scanning member and the film at the terminals. Such arrangements are more or less complicated and may introduce difficulties due to lost-motion in the intervening gearing. This invention provides a novel and simple arrangement in which such lost-motion is eliminated. It reduces the film driving means to a single speed reducing element between the scanning element and the film and incorporates these elements in a unitary structure.

In accordance with a preferred form of the invention, the film engages a driving sprocket or pulley directly mounted upon the shaft carrying a scanning disk and the film is uniformly advanced at any desired relative speed with respect to the scanning member. The film is preferably moved in a straight line between the points at which it is scanned and where it engages the driving pulley so as to avoid any twisting or change of direction of the film between these points which might cause variation in its relation with the scanning member. The film is positioned in a plane normal to the scanning disk and light which is directed to or from the film must have its direction changed by approximately 90° so that the light rays may properly pass to or from the scanning area of the scanning disk. When the scanning member is a scanning disk a 90° change in the direction of the light is required while for a scanning drum a 180° change in direction is necessary, as with either of these scanning arrangements the film is driven in a plane parallel with the axis of rotation of the scanning member or, in other words, so that each transverse line element of the film strip remains parallel with the axis of rotation of the scanning member at least throughout the straight distance of travel of the film, and therefore to properly direct the light to or from the scanning area of a scanning member such a change in the direction of the light is required. Mirrors, prisms, light conducting rods or tubes or equivalents may be used for changing the direction of the light. Any suitable arrangement of apertures in the scanning member, or members, may be employed and a very simple arrangement consists in positioning the apertures in a circle in the scanning member. In this arrangement it is desirable to scan a sufficient number of line series of elemental areas across the film in each revolution of the scanning member to cause such an advance of the film that the driving sprocket or pulley is of reasonable size and thus provide adequate engagement between the film and the pulley without bending the film over too great an angle around the pulley. The mechanism is preferably designed to use standard motion picture film.

This invention as applied to multiple channel scanning and transmission is especially applicable to multiple channel systems such as disclosed in the copending application of F. Gray, Serial No. 438,723, filed March 25, 1930.

A more detailed description of the embodiment of the invention chosen for illustration follows and is illustrated in the accompanying drawing:

Fig. 1 is a side elevation view of the television transmitting, scanning apparatus with the light source omitted;

Fig. 2 is a front elevation view of the apparatus shown in Fig. 1;

Fig. 3 is a plan view of the apparatus shown in Fig. 1 with parts omitted;

Fig. 4 is a side elevation view of the television receiving apparatus; and

Fig. 5 is a front elevation view of the apparatus shown in Fig. 4.

Similar reference characters refer to similar parts of the apparatus.

Referring to Figs. 1, 2 and 3 disclosing the transmitting apparatus, the scanning disk 10 and a film driving sprocket pulley 12 are rigidly mounted on the shaft 11 so as to form a unitary structure. The scanning and film driving unit may be rotated by any suitable means such as the motor 13. The moving film 20 may be a standard or special motion picture film which has been previously developed or it may be a fresh film coming directly from a motion picture camera which after passing through a developing and fixing process is immediately passed to the scanning apparatus. Friction guides 22 and 23, suitably positioned, hold the film taut and guide it through the scanning position preferably in a straight line to the driving sprocket pulley 12. These friction guides are arranged to slightly grip the film at each edge and to clear the central area so as to avoid any damage to the pictures on the film. The film is held in engagement with the driving sprocket by any suitable means such as the guide pulley 24. The scanned film may be wound upon a suitably driven reel 25 or other disposition made of it. The film is moved at a uniform rate and with a definite speed relation to the scanning disk 10 and consequently the apertures in the scanning disk are positioned in a circle. The film travel during the passage of an aperture in scanning a line series of elemental areas is substantially equal to the width of the line scanned. Each succeeding aperture scans an adjacent line and this results in the continuous scanning of juxtaposition line series of elemental areas across the film. A small transverse strip across the film is intensely illuminated by a suitable source of light such as the arc lamp 30 and an optical system for directing the light, the details of which are most clearly shown in Figs. 2 and 3. Light from the source 30 is directed on the film by means of lens 31 and upon passing through the film its direction is changed by the mirror or total reflecting prism 32 towards the scanning disk 10. The lens 33 forms an image of the film on the scanning disk in position for the scanning apertures to scan successively line series of elemental areas of the image. The light scanning beam upon passing through the scanning disk is collected by lens 34 and directed on a light sensitive cell 35 in which photoelectric current is generated which may be amplified by the amplifier 36 and impressed upon a suitable transmission line or channel.

The arrangement of the transmitting apparatus, shown in Figs. 1, 2, and 3 above described, shows the film travel in approximately a vertical direction. While this is a preferable arrangement, particularly if wet film is being used direct from the developing and fixing tank, it is obvious that other directions of the film travel are practicable. The preferable arrangement in the receiving apparatus shown in Figs. 4 and 5 discloses a downward movement of the film in approximately a vertical direction with the exposed film passing directly into the developing and fixing tank. Other arrangements and direction of film travel are here also practicable. An important feature of both the transmitting and receiving apparatus is the movement of the film in a substantially straight line between the driving sprocket pulley and the remote border of the scanning field. In the receiving apparatus where unexposed film is preferably fed downwardly the scanning field of the scanning disk is shown near the top of the disk.

Referring to Figs. 4 and 5 disclosing the receiving apparatus, the scanning light beam is produced by a suitable source of light such as the arc lamp 60 whose rays are collected and focussed by means of the lens 61 on the aperture of a light valve 62. This light valve is controlled by the incoming signals which may be amplified by the input amplifier 56. A longitudinal strip image of the light valve opening is focussed upon a scanning disk by means of the double cylindrical lens 63. If the light valve has a strip opening or a strip light source is directly used then lens 63 may be a spherical lens. The light beam of varying intensity as controlled by the light valve passes through the apertures in the scanning disk and the lens 64 to the reflecting mirror or prism 32 and from there to the film 70 where it is brought to a focus and moved to scan line series of elemental areas across the film. The film driving arrangement is substantially the same as that shown in the transmitting apparatus. The film is directly driven by the sprocket pulley 12 integral with the scanning disk 10 through the shaft 11 rotated by the motor 13. The friction guides 22 and 23 hold the film taut and in position as it passes the scanning field at the side of the reflecting mirror or prism 32. To insure sufficient angular contact between the film and the driving sprocket pulley 12, guide pulley 24 and friction driven guide pulley 26 are employed. Any suitable arrangement may be employed for developing and fixing the film and as here shown this is represented by the tank 21 through which the film is directly passed, thus making it available for immediate projection.

What is claimed is:

1. A rotating scanning element for scanning line series of elemental areas of a field of view in succession, a rotating driving means unitary with said scanning element and rotating about the same axis for directly engaging and driving past said field of view a flexible strip element carrying a pictorial or message representation, an image of which is to be produced, said field of view being spaced from said scanning element in the direction of said axis, means for causing succeeding portions of said strip element to engage said driving means and to traverse the distance between said driving means and the remote boundary of the portion of said strip element of which an image is produced so that each elemental transverse portion therebetween of said strip remains parallel to said axis throughout the said distance, and optical means for giving the scanning light passing between said field and the optically effective portion of said scanning element a direction substantially parallel to said axis.

2. A rotating scanning disk for scanning line series of elemental areas of a field of view in succession, a rotating driving means unitary with said scanning disk and rotating about the same axis for directly engaging and driving past said field of view a flexible strip element carrying a pictorial or message representation, an image of which is to be produced, and means for causing succeeding portions of said strip element to engage said driving means and to traverse the distance between said driving means and the remote boundary of the portion of said strip element of which an image is produced so that each elemental transverse portion therebetween of said strip remains parallel to said axis throughout said distance.

3. A scanning disk, means for causing said disk to scan in succession different line series of elemental areas of a field of view in a plane normal to said disk, a rotating driving means unitary with said scanning disk and rotating about the same axis for directly engaging and driving past said field of view a flexible strip element carrying a pictorial or message representation, an image of which is to be produced, means for causing succeeding portions of said strip element to engage said driving means and to traverse the distance between said driving means and the remote boundary of the portion of said strip element of which an image is produced so that each elemental transverse portion therebetween of said strip remains parallel to said axis throughout said distance.

4. A rotating scanning element for scanning line series of elemental areas of a field of view in succession, a perforated film and a toothed rotary element maintained in positively fixed relation to said rotating scanning element, the teeth of which engage the perforations of said film, rotating about the same axis and directly engaging and driving past said field of view the said perforated film carrying a pictorial or message representation, an image of which is to be produced, said field of view being spaced from said scanning element in the direction of said axis, means for causing succeeding portions of said strip element to engage said driving means and to traverse the distance between said driving means and the remote boundary of the portion of said strip element of which an image is produced so that each elemental transverse portion therebetween of said film remains parallel to said axis throughout said distance, and optical means for giving the scanning light passing between said field and the optically effective portion of said scanning element a direction substantially parallel to said axis.

5. A television system comprising a rotating scanning disk for scanning line series of elemental areas of a field of view in succession, a rotating driving means unitary with said scanning disk and rotating about the same axis for directly engaging and driving past said field of view a flexible strip element carrying a pictorial or message representation, an image of which is to be produced, in a direction approximately normal to the scanning movement of said disk and in a plane normal to said disk, a source of light for illuminating said strip, means for directing light through said strip in a direction approximately normal to its surface, and optical means for giving the scanning light passing between said field and scanning surface of said disk a direction approximately normal to the latter.

6. A television system comprising a rotating scanning element for scanning successive line series of elemental areas of a pictorial or message element of strip form, rotating driving means unitary with said scanning element directly engaging and driving said pictorial or message element, said field of view being spaced from said scanning element in the direction of said axis, optical means for associating successive portions of said pictorial or message element with said scanning element to permit the former to be scanned and means for maintaining said pictorial or message element in engagement with said driving means.

In witness whereof, I hereunto subscribe my name this 5th day of November, 1930.

FRANK GRAY.